United States Patent
Li et al.

(10) Patent No.: US 10,467,486 B2
(45) Date of Patent: Nov. 5, 2019

(54) METHOD FOR EVALUATING CREDIBILITY OF OBSTACLE DETECTION

(71) Applicant: AUTOMOTIVE RESEARCH & TESTING CENTER, Lugong (TW)

(72) Inventors: Chuan-Ren Li, Lugong (TW); Han-Wen Huang, Lugong (TW); Li-You Syu, Lugong (TW)

(73) Assignee: AUTOMOTIVE RESEARCH & TESTING CENTER, Lugong, Changhua County (TW)

( * ) Notice: Subject to any disclaimer, the term of this patent is extended or adjusted under 35 U.S.C. 154(b) by 200 days.

(21) Appl. No.: 15/857,849

(22) Filed: Dec. 29, 2017

(65) Prior Publication Data
US 2019/0205666 A1     Jul. 4, 2019

(51) Int. Cl.
| | |
|---|---|
| G06K 9/00 | (2006.01) |
| G06K 9/62 | (2006.01) |
| G06T 7/60 | (2017.01) |
| G06K 9/03 | (2006.01) |
| G06T 7/13 | (2017.01) |

(Continued)

(52) U.S. Cl.
CPC ..... G06K 9/00805 (2013.01); G06K 9/00791 (2013.01); G06K 9/03 (2013.01); G06K 9/6256 (2013.01); G06K 9/6269 (2013.01); G06T 7/60 (2013.01); B60W 30/08 (2013.01); B60W 2420/42 (2013.01); B60W 2550/10 (2013.01); G06T 7/13 (2017.01); G06T 7/40 (2013.01); G06T 2207/30261 (2013.01)

(58) Field of Classification Search
CPC ............... G06K 9/00791; G06K 9/00805
See application file for complete search history.

(56) References Cited

U.S. PATENT DOCUMENTS

| | | | | |
|---|---|---|---|---|
| 7,853,072 B2 * | 12/2010 | Han | ...................... | G06K 9/4642 |
| | | | | 382/103 |
| 9,342,759 B1 * | 5/2016 | Chen | .................... | G06K 9/6262 |

(Continued)

FOREIGN PATENT DOCUMENTS

| | | |
|---|---|---|
| CN | 104657724 A | 5/2015 |
| CN | 105224951 A | 1/2016 |
| TW | I592883 B | 7/2017 |

OTHER PUBLICATIONS

Delp et al. "Classifying and Passing 3D Obstacles for Autonomous Driving", 2015 IEEE 18th International Conference on Intelligent Transportation Systems, pp. 1240-1247 (Year: 2015).*

*Primary Examiner* — Nay A Maung
*Assistant Examiner* — Jose Torres
(74) *Attorney, Agent, or Firm* — Hamre, Schumann, Mueller & Larson, P.C.

(57) ABSTRACT

A method is to be implemented by a processor connected to a storage device and an image capturing device, and includes steps of: performing a first and a second classifications on an image received from the image capturing device for respectively obtaining first and second results of obstacle detection, and storing the same in the storage device; determining whether there is a distinct obstacle, which is an obstacle indicated by one of the first and second results of obstacle detection, and not indicated by the other one of the first and second results of obstacle detection; and calculating a penalty score based on the distinct obstacle, and updating a credibility score by subtracting the penalty score therefrom.

10 Claims, 11 Drawing Sheets

(51) Int. Cl.
*G06T 7/40* (2017.01)
*B60W 30/08* (2012.01)

(56) References Cited

U.S. PATENT DOCUMENTS

| | | | | |
|---|---|---|---|---|
| 2008/0069400 | A1* | 3/2008 | Zhu | G06K 9/3241 |
| | | | | 382/103 |
| 2009/0231146 | A1* | 9/2009 | Fujita | G01C 21/3461 |
| | | | | 340/576 |
| 2010/0131155 | A1* | 5/2010 | Becker | G08G 1/163 |
| | | | | 701/45 |
| 2011/0137527 | A1* | 6/2011 | Simon | B60R 1/00 |
| | | | | 701/45 |
| 2011/0200230 | A1* | 8/2011 | Luke | G06K 9/00791 |
| | | | | 382/103 |
| 2012/0281907 | A1* | 11/2012 | Samples | G06K 9/00201 |
| | | | | 382/159 |
| 2014/0160252 | A1* | 6/2014 | Randler | G06K 9/00805 |
| | | | | 348/47 |
| 2017/0180723 | A1* | 6/2017 | Chanussot | G06K 9/00791 |
| 2017/0236011 | A1* | 8/2017 | Lakehal-Ayat | B60R 11/04 |
| | | | | 382/159 |
| 2018/0012082 | A1* | 1/2018 | Satazoda | G06K 9/00805 |
| 2018/0267558 | A1* | 9/2018 | Tiwari | G05D 1/0246 |

* cited by examiner

METHOD FOR EVALUATING CREDIBILITY OF OBSTACLE DETECTION

FIELD

The disclosure relates to credibility evaluation, and more particularly to a method for evaluating credibility of obstacle detection.

BACKGROUND

Advanced Driver Assistance Systems (ADAS) employing image recognition techniques have been utilized in obstacle detection so as to notify vehicle drivers of obstacle(s) ahead, and even enables the vehicles to brake automatically to prevent collision. However, interference from headlight of approaching vehicles, dirt and dust on a lens of an image capturing device of the ADAS system, or a backlit object in an image captured by the image capturing device may cause mistakes during contour tracing or texture analysis, resulting in misleading results of obstacle detection.

SUMMARY

Accordingly, a method for evaluating credibility of obstacle detection is demanded. Therefore, an object of the disclosure is to provide a method for evaluating credibility of obstacle detection.

According to the disclosure, the method is to be implemented by a processor electrically connected to a storage device and an image capturing device. The storage device stores a credibility score indicative of the credibility of obstacle detection. The image capturing device keeps on capturing images and transmits a series of the images to the processor. The method includes steps of:

A) performing, after receiving a current one of the images from the image capturing device, first classification on the current one of the images so as to obtain a current first result of obstacle detection which indicates at least one obstacle detected by the first classification, and storing the current first result of obstacle detection in the storage device;

B) performing, after receiving the current one of the images from the image capturing device, second classification on the current one of the images so as to obtain a current second result of obstacle detection which indicates at least one obstacle detected by the second classification, and storing the current second result of obstacle detection in the storage device;

C) determining whether there is at least one distinct obstacle, which is at least one of the obstacle(s) indicated by one of the current first result of obstacle detection and the current second result of obstacle detection, and not indicated by the other one of the current first result of obstacle detection and the current second result of obstacle detection; and D) calculating, when it is determined that there is at least one distinct obstacle, a penalty score based on said at least one distinct obstacle, and updating the credibility score by subtracting the penalty score from the credibility score.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
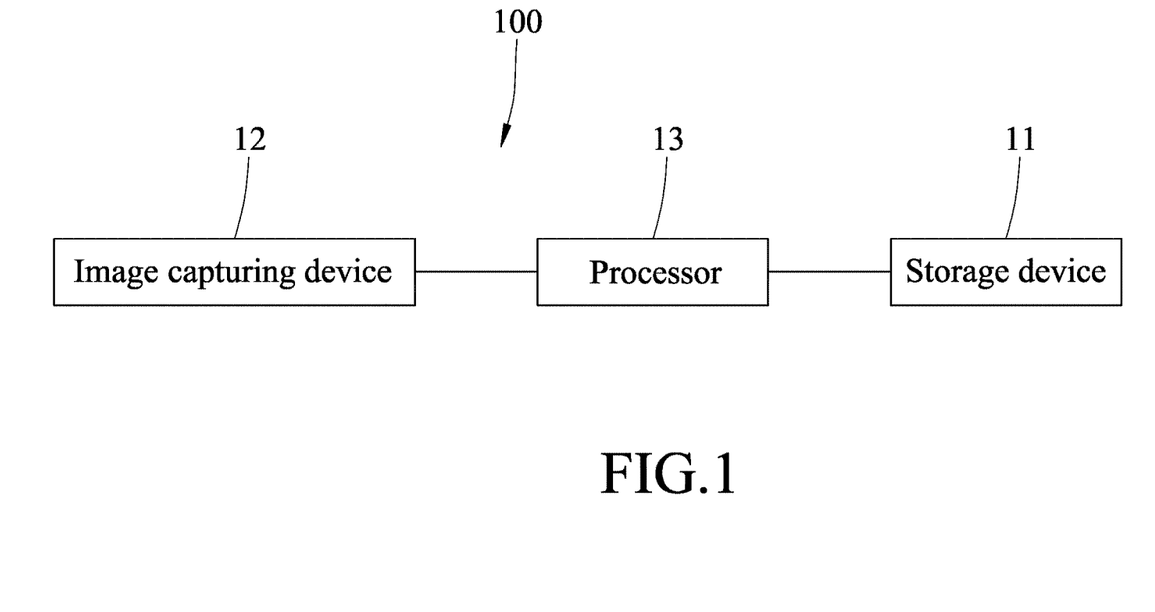
FIG. 1 is a block diagram illustrating an embodiment of a system implementing a method for evaluating credibility of obstacle detection according to the disclosure.

FIG. 1 illustrates an embodiment of a system 100 that is utilized to implement a method for evaluating credibility of obstacle detection according to the disclosure. The system 100 includes a storage device 11, an image capturing device 12, and a processor 13 electrically connected to the storage device 11 and the image capturing device 12.

In this embodiment, the processor 13 is implemented by a Central Processing Unit (CPU), a microprocessor or any circuit configurable/programmable in a software manner and/or hardware manner to implement functionalities of this disclosure, but implementation of the processor 13 is not limited to the above and may vary in other embodiments.

The image capturing device 12 keeps on capturing images and transmits a series of the images to the processor 13. In this embodiment, the image capturing device 12 is implemented by a camera or a video recorder, but implementation of the image capturing device 12 is not limited to the above disclosure and may vary in other embodiments.

The storage device 11 stores a credibility score that is indicative of the credibility of obstacle detection, a first lookup table, a second lookup table, a first penalty weight and a second penalty weight. The credibility score may be implemented to be 100 points, but implementation thereof is not limited thereto and may vary in other embodiment. The first lookup table and the second lookup table are respectively exemplified by Table 1 and Table 2 shown below. In this embodiment, the storage device 11 is implemented by a flash memory, a hard disk drive (HDD) or a solid state disk (SSD), but implementation of the storage device 11 is not limited to what are disclosed herein and may vary in other embodiments.

TABLE 1

| Distance | Base penalty points | |
|---|---|---|
| | Person | Car |
| 10 meters | 100 | 70 |
| 30 meters | 70 | 40 |
| 50 meters | 40 | 10 |

TABLE 2

| Position | Raw penalty points |
|---|---|
| Central | 1000 |
| Paracentral | 50 |
| Peripheral | 0 |

The first lookup table contains information of at least one correspondence relationship between base penalty points representative of severity of failing to detect an obstacle (e.g., 100, 70 40 and 10 as listed in Table 1), and a combination of a type of the obstacle and an actual distance of the obstacle from the image capturing device 12. The second lookup table contains information of at least one correspondence relationship between raw penalty points representative of severity of failing to detect an obstacle in one of two consecutive images (e.g., 1000, 50 and 0 as listed in Table 2) and a position of the obstacle in the other one of the two consecutive images. The first penalty weight corresponds to a process of first classification, and the second penalty weight corresponds to a process of second classification. In this embodiment, the first penalty weight is implemented to be 0.2, and the second penalty weight is implemented to be 0.8. However, implementations of the first and second penalty weights are not limited thereto and may vary in other embodiments.

In this embodiment, for one image, the first classification is implemented by detection of contour and texture in the image, and the second classification is implemented according to deep learning. Specifically speaking, the first classification is implemented to carry out detection of contour and texture in the image according to histogram of oriented gradients (HOG) and logarithm weighted pattern (LWP), and to carry out detection of obstacles in the image according to support vector machine (SVM). The second classification is implemented to carry out detection of obstacles in the image according to convolutional neural networks (CNN). However, implementations of the first and second classification are not limited to what are disclosed herein and may vary in other embodiments.

Figure 2:
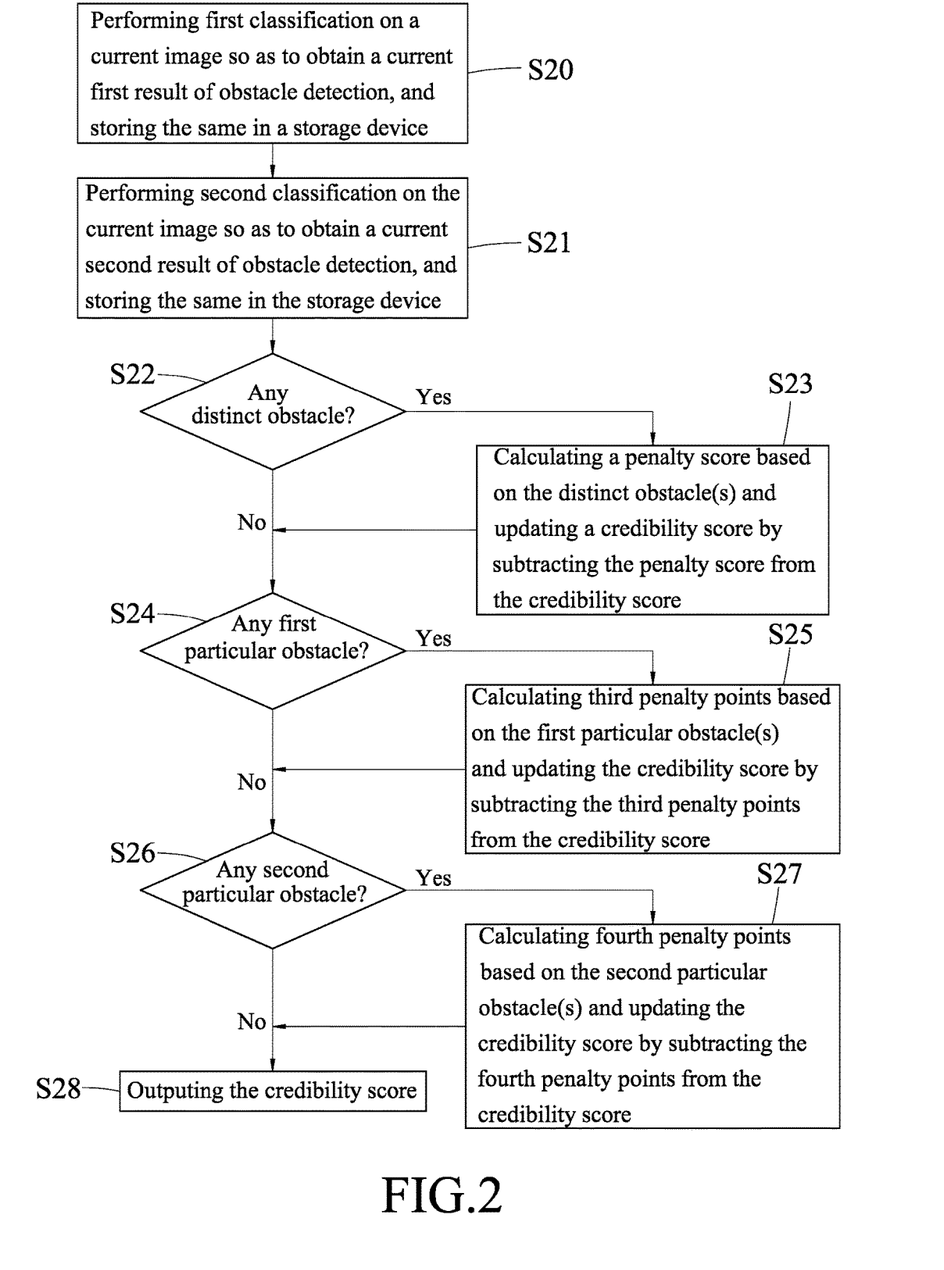
FIG. 2 is a flow chart illustrating an embodiment of the method for evaluating credibility of obstacle detection according to the disclosure.

Referring to FIG. 2, an embodiment of the method for evaluating credibility of obstacle detection according to the disclosure is illustrated. The method includes steps S20-S28 that are described in the following.

Figure 3:
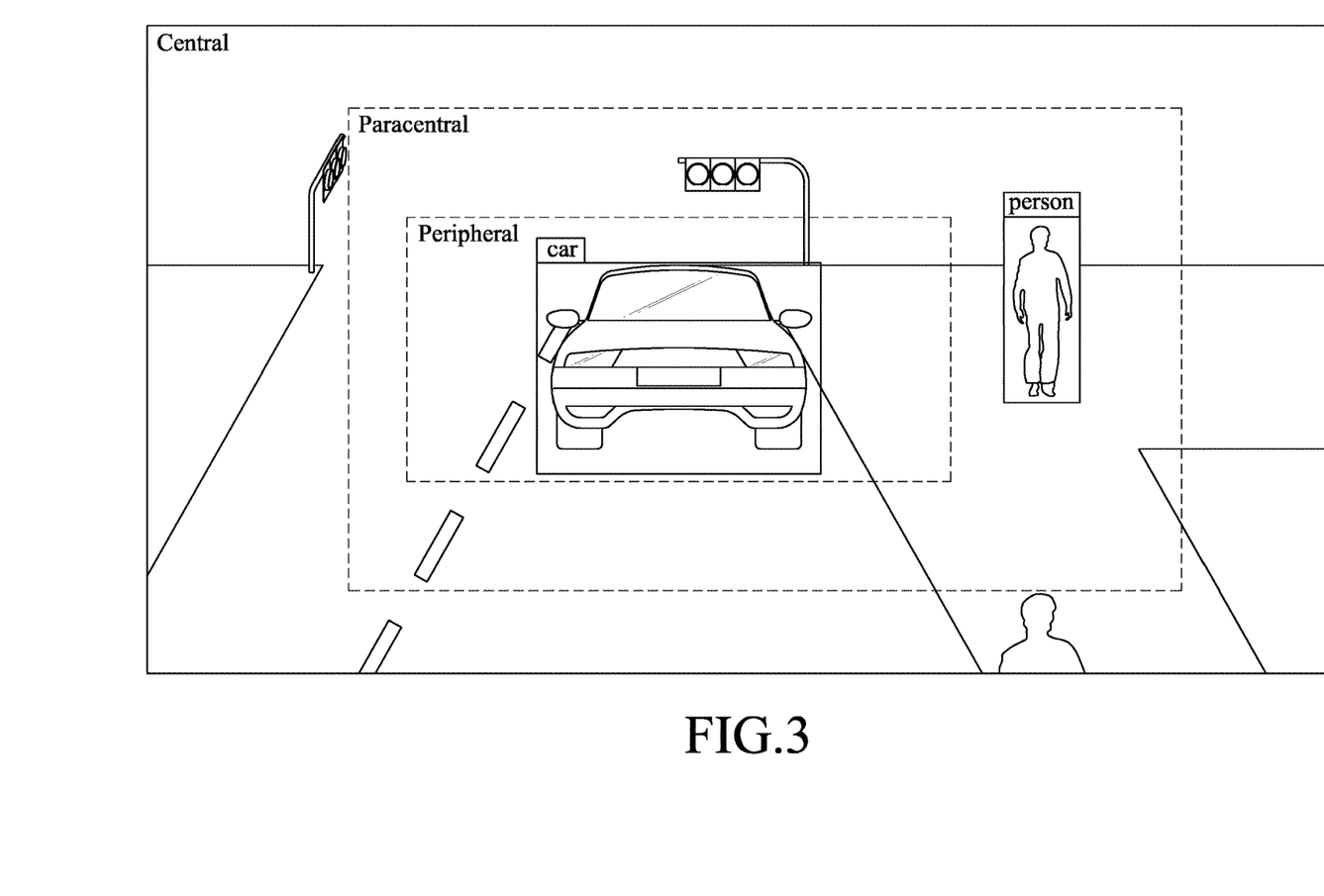
FIG. 3 is a schematic diagram illustrating an embodiment of a current first result of obstacle detection.

In step S20, after receiving a current one of the images (hereinafter also referred to as "the current image") from the image capturing device 12, the processor 13 performs the first classification on the current image so as to obtain a current first result of obstacle detection as shown in FIG. 3, and stores the current first result of obstacle detection in the storage device 11. The current first result of obstacle detection indicates at least one obstacle detected by the first classification in the current image (e.g., two obstacles are detected in this embodiment), at least one type of the obstacle(s) detected by the first classification in the current image (e.g., a car type and a person type are detected in this embodiment), and at least one position of the obstacle(s) detected by the first classification in the current image (e.g., a car is detected in a central region and a person is detected in a paracentral region).

Figure 4:
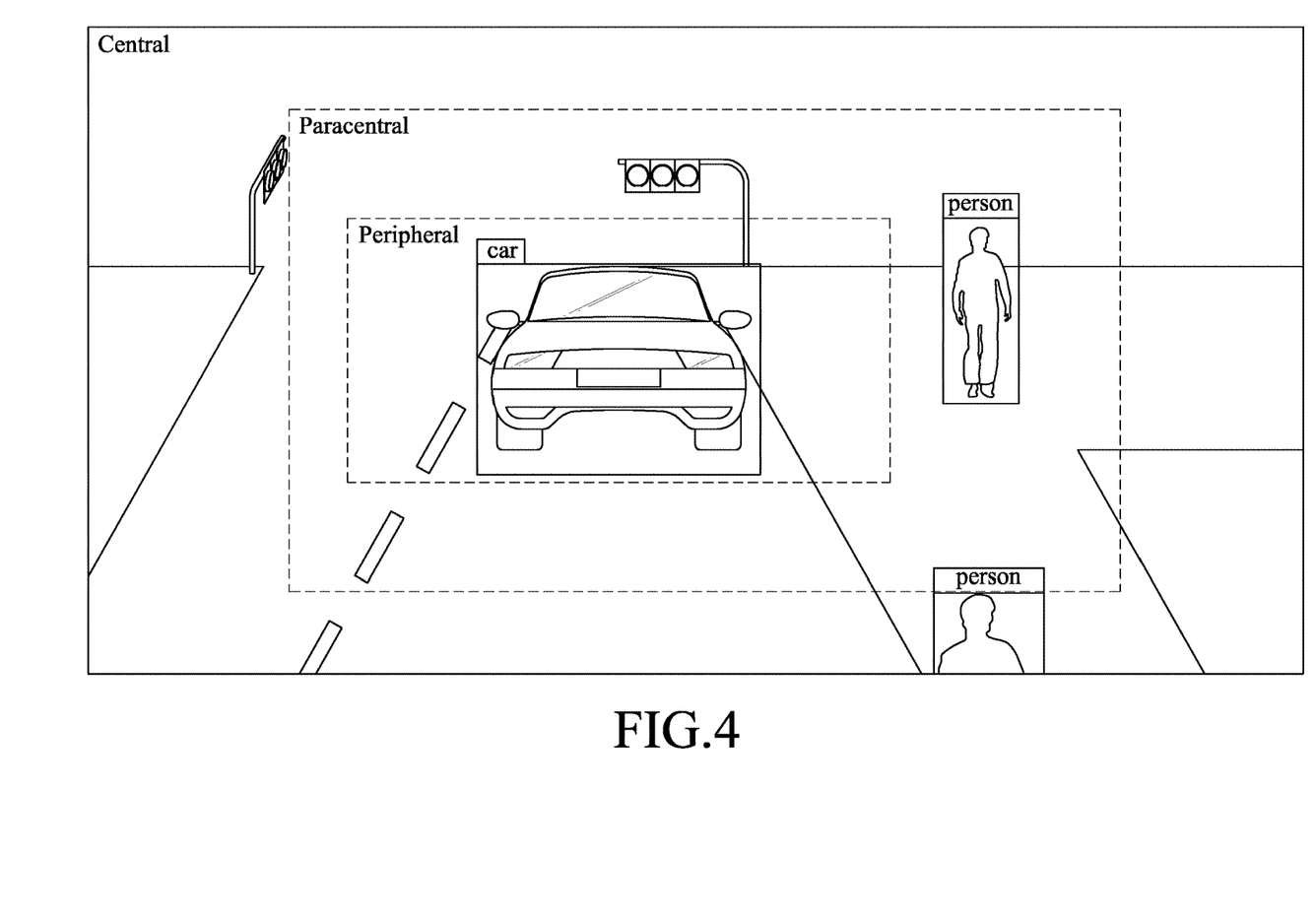
FIG. 4 is a schematic diagram illustrating an embodiment of a current second result of obstacle detection.

Similarly, in step S21, after receiving the current image from the image capturing device 12, the processor 13 performs the second classification on the current image so as to obtain a current second result of obstacle detection as shown in FIG. 4, and stores the current second result of obstacle detection in the storage device 11. The current second result of obstacle detection indicates at least one obstacle detected by the second classification in the current image (e.g., three obstacles are detected in this embodiment), at least one type of the obstacle(s) detected by the second classification in the current image (e.g., a car type and a person type are detected in this embodiment), and at least one position of the obstacle(s) detected by the second classification in the current image (e.g., a car is detected in the central region, a person is detected in the paracentral region, and another person is detected in a peripheral region).

It should be noted that in two consecutive cycles of the procedure of the embodiment of the method, the current first and second results of obstacle detection stored in the storage device 11 in the former cycle will serve as previous first and second results of obstacle detection in the later cycle. In other words, the previous first result of obstacle detection is obtained by performing the first classification on a previous one of the images (also referred to hereinafter as previous image), and the previous second result of obstacle detection is obtained by performing the second classification on the previous image. Accordingly, the previous first result of obstacle detection indicates the obstacle(s) detected by the first classification and the corresponding position(s) thereof in the previous image, and the previous second result of obstacle detection indicates the obstacle(s) detected by the second classification and the corresponding position(s) thereof in the previous image.

In step S22, the processor 13 determines whether there is at least one distinct obstacle, which is defined as an obstacle indicated by one of the current first result of obstacle detection and the current second result of obstacle detection, and not indicated by the other one of the current first result of obstacle detection and the current second result of obstacle detection. When it is determined by the processor 13 that there is no distinct obstacle (in the current image), a flow of this method proceeds to step S24. Otherwise, when it is determined by the processor 13 that there is at least one distinct obstacle, the flow of this method proceeds to step S23.

In step S23, the processor 13 calculates a penalty score based on said at least one distinct obstacle, and updates the credibility score by subtracting the penalty score from the credibility score. Specifically speaking, step S23 includes sub-steps S231-S236 recited below and shown in FIG. 5, where a total number of said at least one distinct obstacle is assumed to be N and N is greater than or equal to one. It should be noted that the embodiment of calculating the penalty score is not limited to what will be disclosed herein and may vary in other embodiments.

Figure 5:
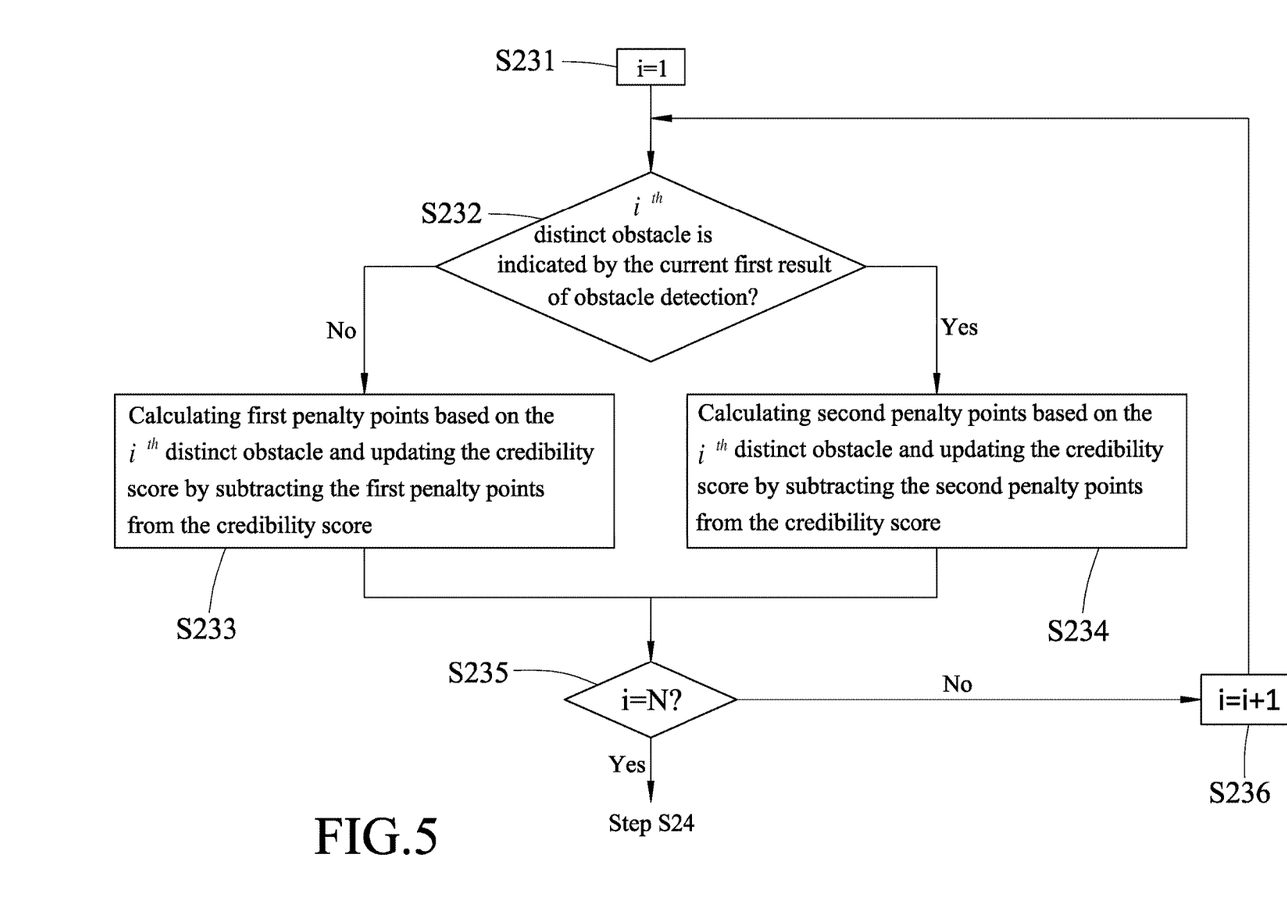
FIG. 5 is a flow chart illustrating an embodiment of sub-steps of calculating a penalty score in the method according to the disclosure.

In sub-step S231, the processor 13 assigns an initial value to a loop counter i, which represents an ordinal number of said at least one distinct obstacle(s). In this embodiment, one is assigned to the loop counter i, i.e., i=1.

In sub-step S232, the processor 13 determines whether one of said at least one distinct obstacle(s) the ordinal number of which is i (referred to as the $i^{th}$ distinct obstacle hereinafter) is indicated by the current first result of obstacle detection. When it is determined that the $i^{th}$ distinct obstacle is indicated by the current first result of obstacle detection, the flow of the penalty score calculation procedure proceeds to sub-step S234. On the other hand, when it is determined that the $i^{th}$ distinct obstacle is not indicated by the current first result of obstacle detection, the flow of the penalty score calculation procedure proceeds to sub-step S233.

In step sub-S233, the processor 13 calculates first penalty points, which serve as a portion of the penalty score, based on the $i^{th}$ distinct obstacle, and updates the credibility score by subtracting the first penalty points from the credibility score. Specifically speaking, in this embodiment, the processor 13 computes an actual distance of the $i^{th}$ distinct obstacle from the image capturing device 12 based on the position of the $i^{th}$ distinct obstacle in the current image according to an image-based distance estimation approach, obtains the base penalty points for the $i^{th}$ distinct obstacle based on the first lookup table and a combination of the type of the $i^{th}$ distinct obstacle and the actual distance of the $i^{th}$ distinct obstacle from the image capturing device 12, and calculates the first penalty points by multiplying the first penalty weight and the base penalty points thus obtained. It is worth to note that implementation of the calculation of the first penalty points is not limited to what have been described herein and may vary in other embodiments. For example, the processor 13 may calculate the first penalty points by multiplying the first penalty weight and the base penalty points which are obtained based on other features (e.g., a shape) of the $i^{th}$ distinct obstacle and another lookup table, or by multiplying the first penalty weight and a fixed number of base penalty points. It is worth noting that since computation of the actual distance of the $i^{th}$ distinct obstacle from the image capturing device 12 is well known to one skilled in the relevant art, detailed explanation of the same is omitted herein for the sake of brevity.

When it is determined that the $i^{th}$ distinct obstacle is indicated in the current first result of obstacle detection, i.e., the $i^{th}$ distinct obstacle is not indicated in the current second result of obstacle detection, in sub-step S234, the processor 13 calculates second penalty points, which serve as a portion of the penalty score, based on the $i^{th}$ distinct obstacle, and updates the credibility score by subtracting the second penalty points from the credibility score. Specifically speaking, in this embodiment, the processor 13 computes an actual distance of the $i^{th}$ distinct obstacle from the image capturing device 12 based on the position of the $i^{th}$ distinct obstacle in the current image according to the image-based distance estimation approach, obtains the base penalty points based on the first lookup table and a combination of the type of the $i^{th}$ distinct obstacle and the actual distance of the $i^{th}$ distinct obstacle from the image capturing device 12, and calculates the second penalty points by multiplying the second penalty weight and the base penalty points thus obtained. Similarly, implementation of the calculation of the second penalty points is not limited to what has been described herein and may vary in other embodiments. For example, the processor 13 may calculate the second penalty points by multiplying the second penalty weight and the base penalty points which are obtained based on other features (e.g., the shape) of the $i^{th}$ distinct obstacle and another lookup table, or by multiplying the second penalty weight and a fixed number of base penalty points.

In sub-step S235, the processor 13 determines whether the loop counter i is equal to N. It is worth to note that implementation of the determination made in step 235 depends on the initial value of the loop counter i, and is not limited to the disclosure herein and may vary in other embodiments. When it is determined that the loop counter i is not equal to N, the loop counter i is increased by one as shown in sub-step S236, and then the flow of the penalty score calculation procedure goes back to sub-step S232. Sub-steps S232-S236 are then repeated until it is determined that the loop counter i is equal to N. When it is determined that the loop counter i is equal to N, the penalty score calculation procedure is completed, and the flow of this method proceeds to step S24.

In step S24, based on the current first result of obstacle detection and the previous first result of obstacle detection, the processor 13 determines whether there is at least one first particular obstacle, which is defined as an obstacle indicated by one of the current first result of obstacle detection and the previous first result of obstacle detection, and not indicated by the other one of the current first result of obstacle detection and the previous first result of obstacle detection. When it is determined by the processor 13 that there is no first particular obstacle, the flow of this method proceeds to step S26. Otherwise, when it is determined that there is at least one first particular obstacle, the flow of this method proceeds to step S25.

In step S25, the processor 13 calculates third penalty points based on said at least one first particular obstacle, and updates the credibility score by subtracting the third penalty points from the credibility score. Specifically speaking, the processor 13 obtains the raw penalty points based on the second lookup table and the position of said at least one first particular obstacle indicated by said one of the current first result of obstacle detection and the previous first result of obstacle detection, and calculates the third penalty points by multiplying the first penalty weight and the raw penalty points thus obtained. It is worth to note that implementation of the calculation of the third penalty points is not limited to what has been described herein and may vary in other embodiments. For example, the processor 13 may calculate the third penalty points by multiplying the first penalty weight and the raw penalty points which are obtained based on other features (e.g., a shape) of said at least one first particular obstacle and another lookup table, or by multiplying the first penalty weight and a fixed number of raw penalty points.

In step S26, based on the current second result of obstacle detection and the previous second result of obstacle detection, the processor 13 determines whether there is at least one second particular obstacle, which is defined as an obstacle indicated by one of the current second result of obstacle detection and the previous second result of obstacle detection, and not indicated by the other one of the current second result of obstacle detection and the previous second result of obstacle detection. When it is determined by the processor 13 that there is no second particular obstacle, the flow of this method proceeds to step S28. Otherwise, when it is determined by the processor 13 that there is at least one second particular obstacle, the flow of this method proceeds to step S27.

In step S27, the processor 13 calculates fourth penalty points based on said at least one second particular obstacle, and updates the credibility score by subtracting the fourth penalty points from the credibility score. Specifically speaking, the processor 13 obtains the raw penalty points based on the second lookup table and the position of said at least one second particular obstacle indicated by said one of the current second result of obstacle detection and the previous second result of obstacle detection, and calculates the fourth penalty points by multiplying the second penalty weight and the raw penalty points thus obtained. It is worth to note that implementation of calculation of the fourth penalty points is not limited to what is disclosed herein and may vary in other embodiments. For example, the processor 13 may calculate the fourth penalty points by multiplying the second penalty weight and the raw penalty points which are obtained based on other features (e.g., a shape) of said at least one second particular obstacle and another lookup table, or by multiplying the second penalty weight and a fixed number of raw penalty points.

In step S28, the processor 13 outputs the credibility score eventually obtained through the updates made in steps S23, S25 and S27, and then reset the credibility score to 100. In this embodiment, when the credibility score eventually obtained is negative, the processor adjusts the credibility score to zero before outputting the same. However, implementation of the output of the credibility score by the processor 13 is not limited thereto and may vary in other embodiments. For example, the processor 13 may directly output a negative credibility score eventually obtained without adjusting the same to zero beforehand.

It should be noted that in this embodiment, steps S22 and S23 come before steps S24 to S27, but implementation of the order of the flow is not limited thereto and may vary in other embodiments. In one embodiment, steps S24 to S27 are carried out prior to steps S22 and S23, i.e., the flow goes to step S22 when the determination made in step S26 is negative, and the flow goes to step S28 when the determination made in step S22 is negative.

It should be noted that the third penalty points and the fourth penalty points are associated with respective positions of the first and second particular obstacles detected in only one of two consecutive images, and can be utilized to reflect in which situation the first and second particular obstacles occur. One situation is that the first (or second) particular obstacle is intruding into the peripheral region of an imaging range of the image capturing device 12, which is an ordinary scenario that commonly occurs on the road. Another situation is that the system 100 may have made a mistake on detection so the first (or second) particular obstacle is suddenly detected in the central region of the current image when not detected in the previous image, or is detected in the central region of the previous image and suddenly disappears from the current image.

Moreover, the first classification corresponds to the first and third penalty points, and the second classification corresponds to the second and fourth penalty points.

Figure 6:
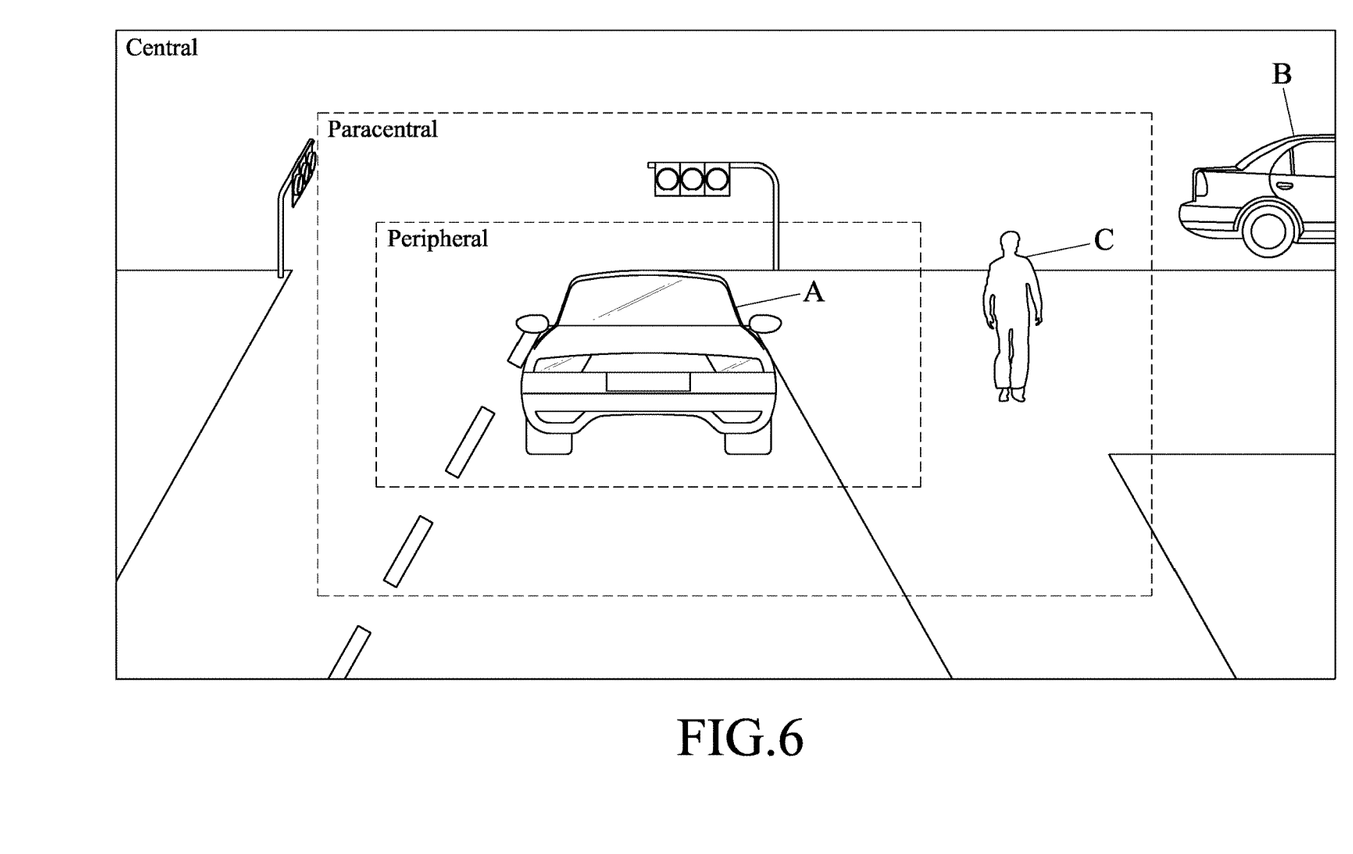
FIG. 6 is a schematic diagram illustrating an embodiment of a previous one of the images.
Figure 7:
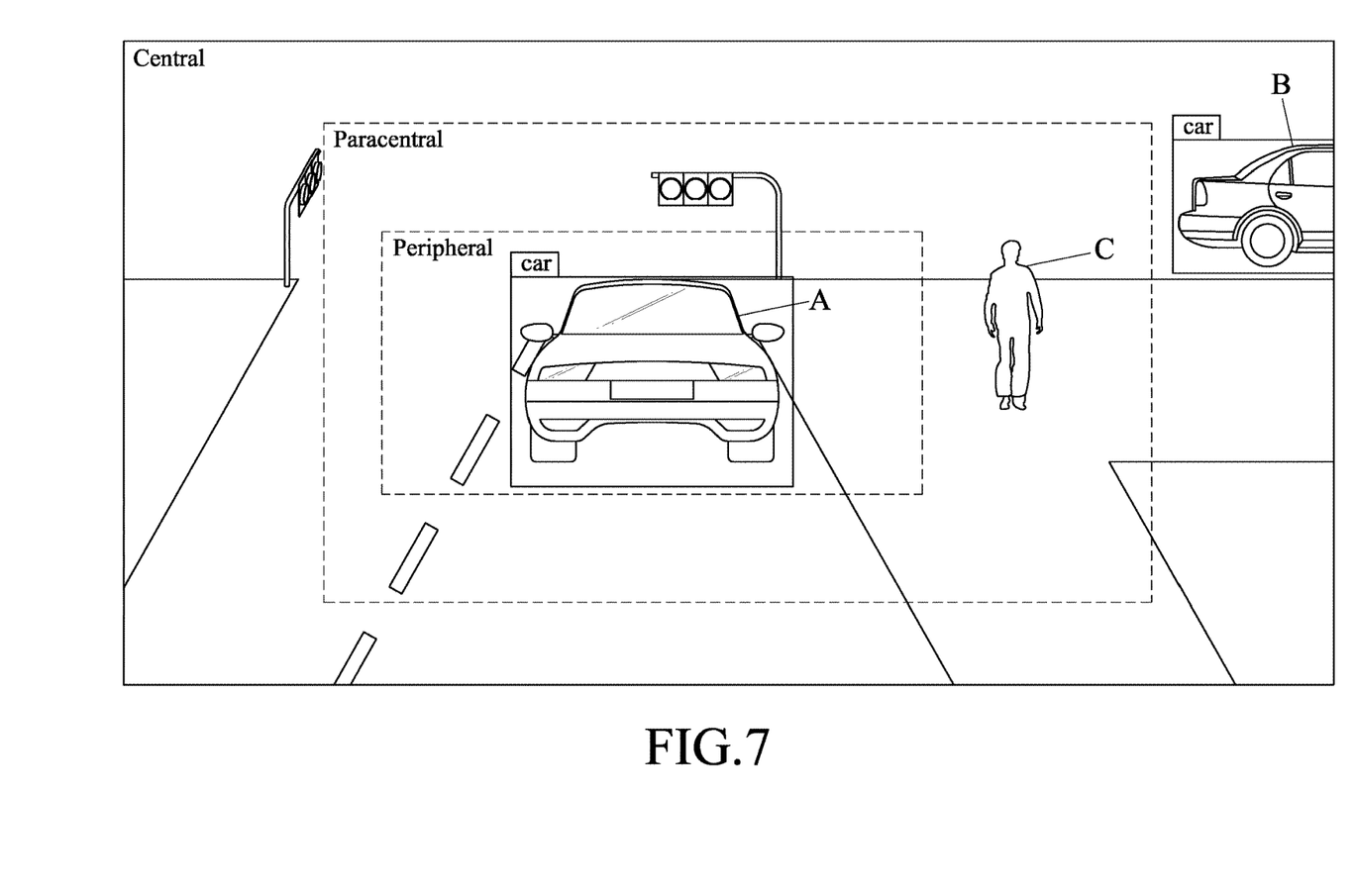
FIG. 7 is a schematic diagram illustrating an embodiment of a previous first result of obstacle detection that is obtained by performing first classification on the image of FIG. 6.
Figure 8:
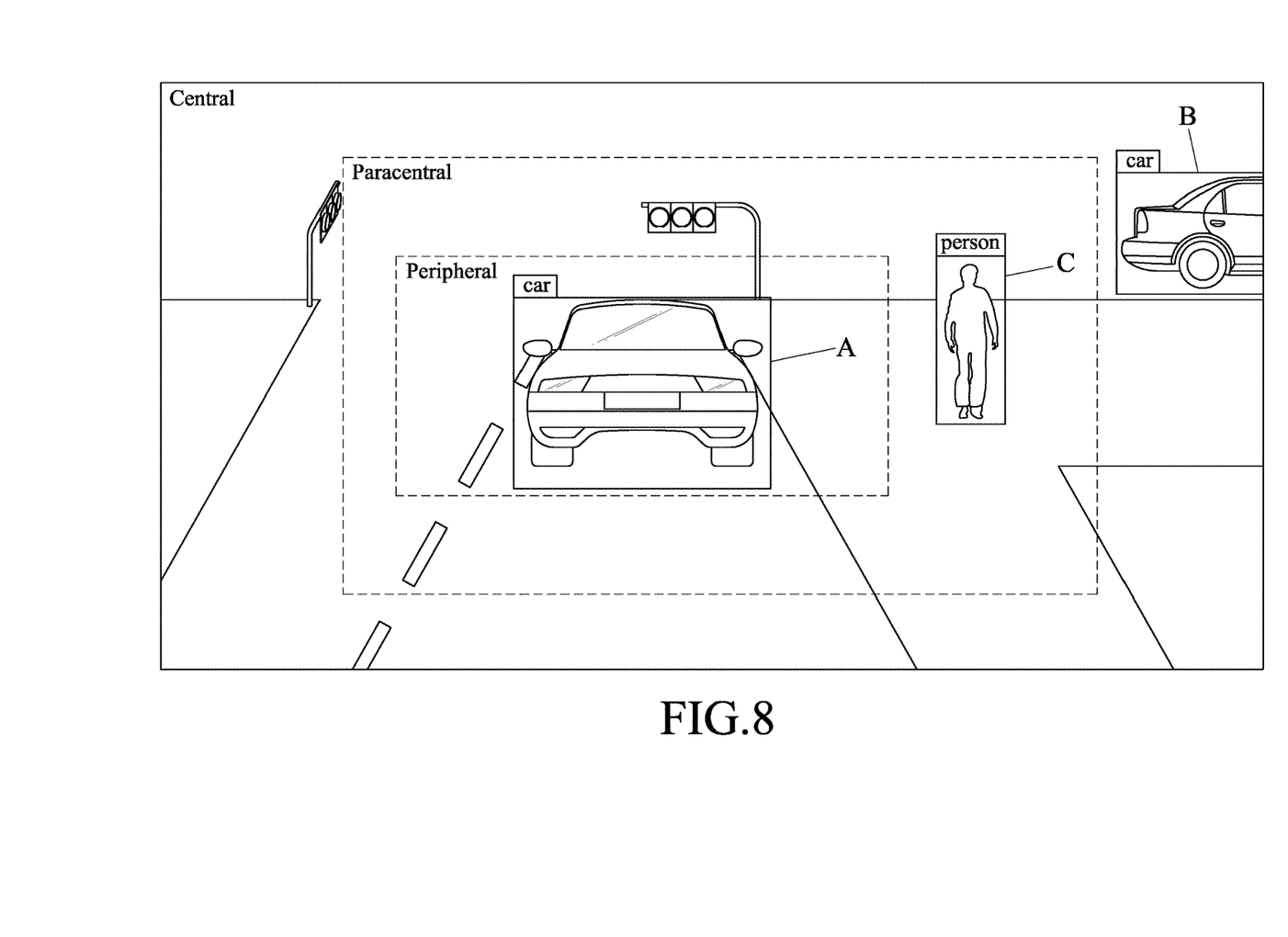
FIG. 8 is a schematic diagram illustrating an embodiment of a previous second result of obstacle detection that is obtained by performing second classification on the image of FIG. 6.
Figure 9:
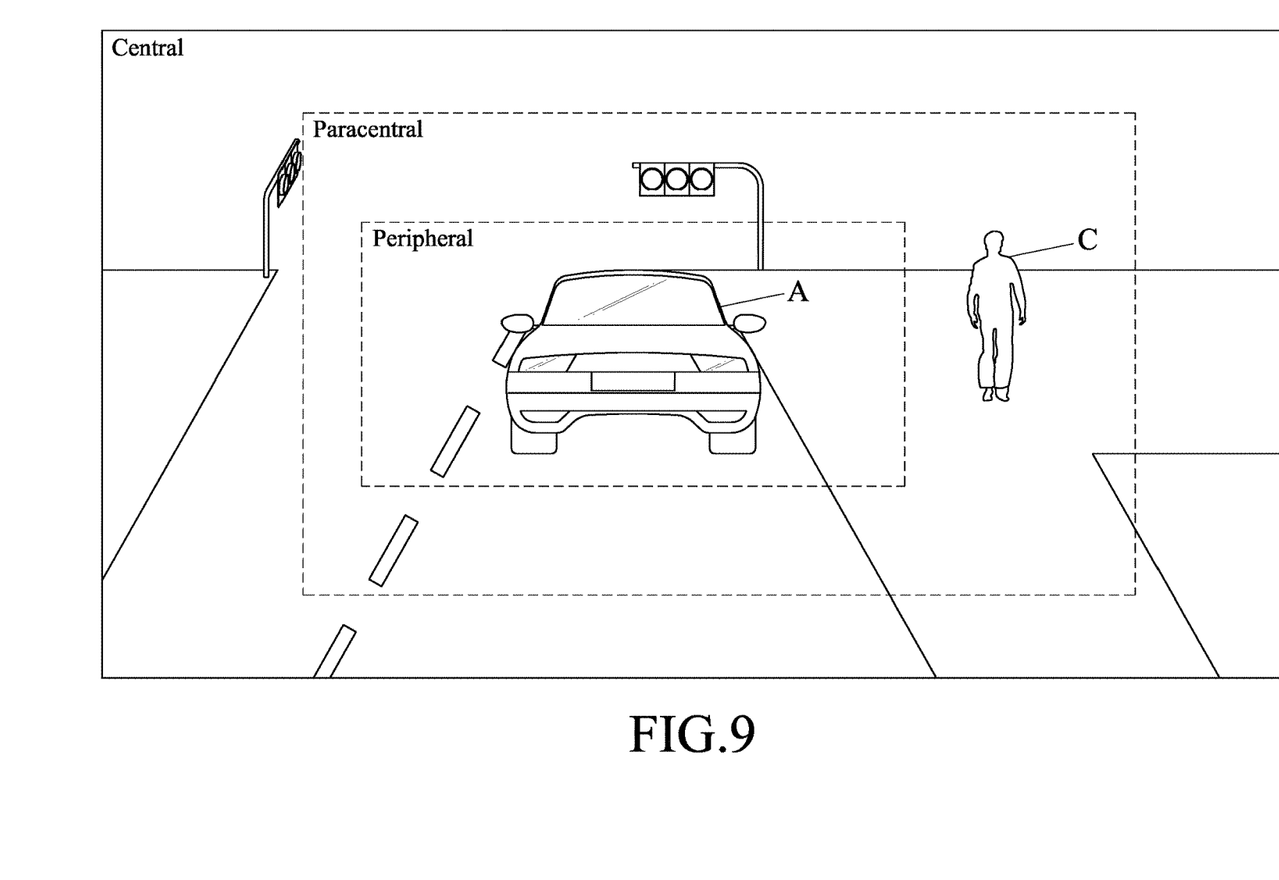
FIG. 9 is a schematic diagram illustrating an embodiment of a current one of the images.
Figure 10:
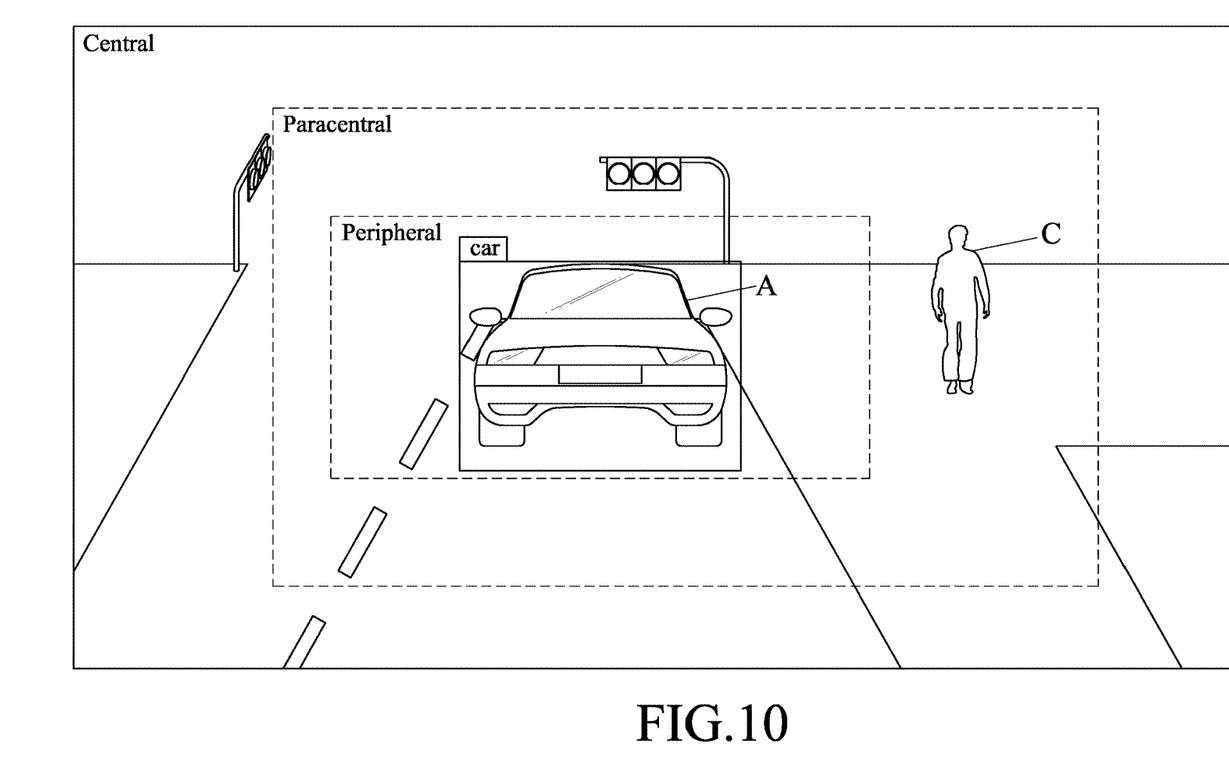
FIG. 10 is a schematic diagram illustrating another embodiment of the current first result of obstacle detection that is obtained by performing the first classification on the image of FIG. 9.
Figure 11:
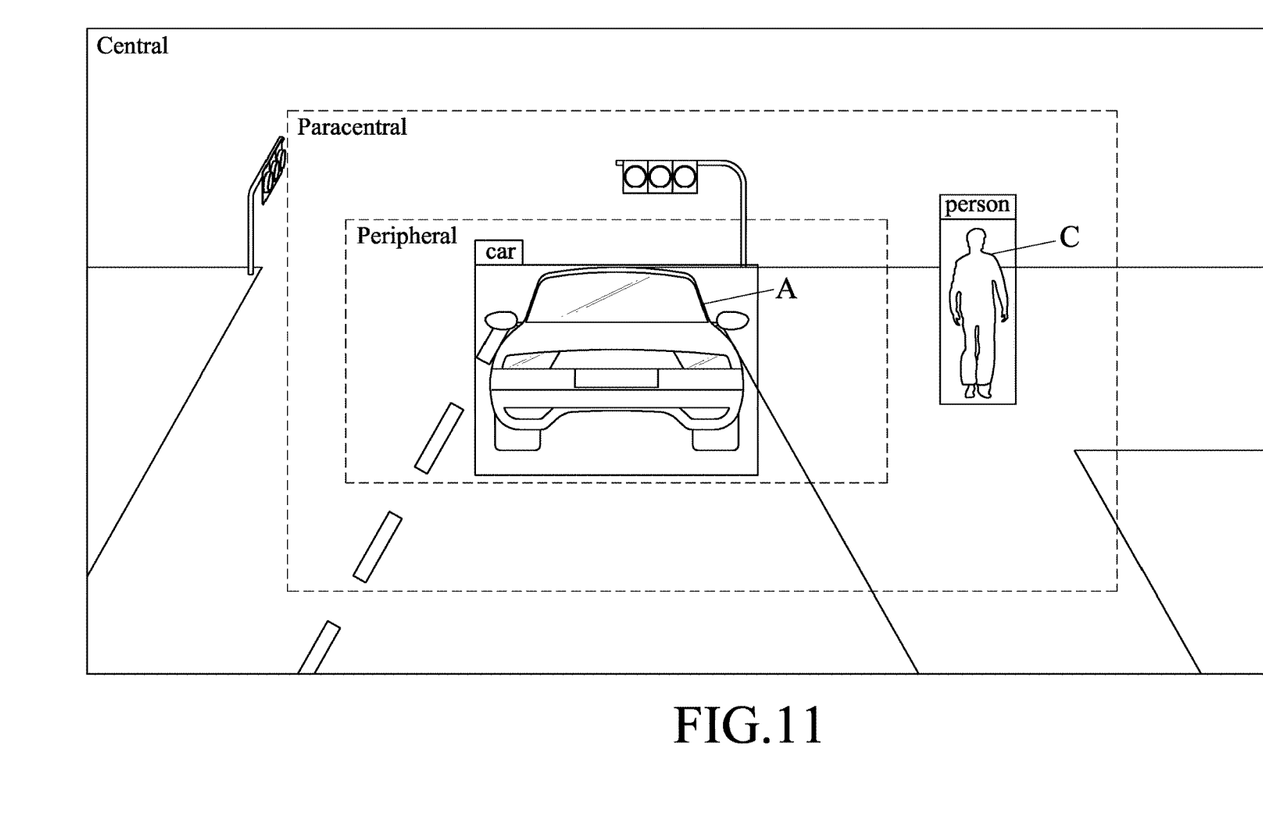
FIG. 11 is a schematic diagram illustrating another embodiment of the current second result of obstacle detection that is obtained by performing the second classification on the image of FIG. 9.

Referring to FIGS. 6 to 11, an example of an application of the method of this disclosure is provided for explanation. FIG. 6 exemplifies a previous image that includes obstacles (A), (B) and (C). FIG. 7 exemplifies a previous first result of obstacle detection obtained by the processor 13 through performing the first classification on the image shown in FIG. 6. The previous first result of obstacle detection indicates that the obstacle (A) is a car positioned in a central region of the (previous) image, and an actual distance between the obstacle (A) and the image capturing device 12 is computed by the processor 13 based on the position of the obstacle (A) (i.e., the central region) to be ten meters. In addition, the previous first result of obstacle detection further indicates that the obstacle (B) is a car positioned in a peripheral region of the (previous) image, and an actual distance between the obstacle (B) and the image capturing device 12 is computed to be thirty meters. FIG. 8 exemplifies a previous second result of obstacle detection obtained by the processor 13 through performing the second classification on the image shown in FIG. 6. The previous second result of obstacle detection indicates that the obstacle (A) is a car positioned in the central region of the (previous) image, and the actual distance between the obstacle (A) and the image capturing device 12 is computed to be ten meters. In addition, the previous second result of obstacle detection also indicates that the obstacle (B) is a car positioned in the peripheral region of the (previous) image, and the actual distance between the obstacle (B) and the image capturing device 12 is computed to be thirty meters. Moreover, the previous second result of obstacle detection further indicates that the obstacle (C) is a person positioned in a paracentral region of the (previous) image. An actual distance between the obstacle (C) and the image capturing device 12 is computed to be thirty meters. FIG. 9 exemplifies a current image that includes obstacles (A) and (C). FIG. 10 exemplifies a current first result of obstacle detection obtained by the processor 13 through performing the first classification on the image shown in FIG. 9. The current first result of obstacle detection indicates that the obstacle (A) is a car positioned in a central region of the (current) image, and an actual distance between the obstacle (A) and the image capturing device 12 is computed to be ten meters. FIG. 11 exemplifies a current second result of obstacle detection obtained by the processor 13 through performing the second classification on the image shown in FIG. 9. The current second result of obstacle detection indicates that the obstacle (A) is a car positioned in the central region of the (current) image. The actual distance between the obstacle (A) and the image capturing device is computed to be ten meters. Furthermore, the current second result of obstacle detection further indicates that the obstacle (C) is a person positioned in a paracentral region of the (current) image. Moreover, an actual distance between the obstacle (C) and the image capturing device is computed to be thirty meters.

Referring to FIGS. 10 and 11, the obstacle (C) is indicated by the current second result of obstacle detection, but is not indicated by the current first result of obstacle detection. Consequently, as shown in step S22 of the method of this disclosure, the processor 13 determines that the obstacle (C) is a distinct obstacle that is not indicated in the current first result of obstacle detection. As mentioned in sub-step S233, based on the first lookup table and a combination of the type of the distinct obstacle (i.e., person) and the actual distance of the distinct obstacle from the image capturing device 12 (i.e., thirty meters), the processor 13 obtains the base penalty points for the distinct obstacle (i.e., 70). Next, the processor 13 multiplies the first penalty weight (i.e., 0.2) and the base penalty points thus obtained for the distinct obstacle so as to obtain the first penalty points (i.e., 0.2×70=14). Thereafter, the processor 13 updates the credibility score by subtracting the first penalty points from the credibility score (i.e., 100−14=86).

Referring to FIGS. 7 and 10, the obstacle (B) is indicated by the previous first result of obstacle detection, but is not indicated by the current first result of obstacle detection. Consequently, as mentioned in step S24, the processor 13 determines that the obstacle (B) is a first particular obstacle that is not indicated by the current first result of obstacle detection. In step S25, based on the second lookup table and the position of the first particular obstacle (i.e., the peripheral region), the processor 13 obtains the raw penalty points for the first particular obstacle (i.e., 0). Next, the processor 13 multiplies the first penalty weight (i.e., 0.2) and the raw penalty points thus obtained for the first particular obstacle so as to obtain the third penalty points (i.e., 0.2×0=0). Thereafter, the processor 13 updates the credibility score by subtracting the third penalty points from the credibility score (i.e., 86−0=86).

Referring to FIGS. 8 and 11, the obstacle (B) is indicated by the previous second result of obstacle detection, but is not indicated by the current second result of obstacle detection. Consequently, in step S26, the processor 13 determines that the obstacle (B) is a second particular obstacle that is not indicated in the current second result of obstacle detection. As shown in step S27, based on the second lookup table and the position of the second particular obstacle (i.e., the peripheral region), the processor 13 obtains the raw penalty points for the second particular obstacle (i.e., 0). Next, the processor 13 multiplies the second penalty weight (i.e., 0.8) and the raw penalty points thus obtained for the second particular obstacle so as to obtain the fourth penalty points (i.e., 0.8×0=0). Thereafter, the processor 13 updates the credibility score by subtracting the fourth penalty points from the credibility score (i.e., 86−0=86). Finally, the processor 13 outputs the credibility score (i.e., 86).

The credibility score may be utilized to facilitate switching between different automotive driving modes (e.g., a fully-automated driving mode where no human driver control is required, a partially-automated driving mode where a driver assistance system executes steering and/or acceleration and deceleration while a human driver performs the remaining tasks, and no-automated driving mode where a human driver performs all aspects of driving tasks) of a vehicle. The vehicle may switch to the fully-automated driving mode when the credibility score is high (favorable), while the partially-automated driving mode is switched to by the vehicle when the credibility score is moderate. The vehicle switches to the no-automated driving mode when the credibility score is low (undesirable).

In summary, the method of this disclosure utilizes the processor 13 to determine distinct obstacles and particular obstacles based on results of obstacle detections so as to obtain the first, second, third and fourth penalty points, and to calculate the credibility score for evaluating credibility of the results of obstacle detection.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for evaluating credibility of obstacle detection, the method to be implemented by a processor electrically connected to a storage device and an image capturing device, the storage device storing a credibility score that is indicative of the credibility of obstacle detection, the image capturing device keeping on capturing images and transmitting a series of the images to the processor, the method comprising steps of:
   A) performing, after receiving a current one of the images from the image capturing device, first classification on the current one of the images so as to obtain a current first result of obstacle detection which indicates at least one obstacle detected by the first classification, and storing the current first result of obstacle detection in the storage device;
   B) performing, after receiving the current one of the images from the image capturing device, second classification on the current one of the images so as to obtain a current second result of obstacle detection which indicates at least one obstacle detected by the second classification, and storing the current second result of obstacle detection in the storage device;
   C) determining whether there is at least one distinct obstacle, which is at least one of the obstacle(s) indicated by one of the current first result of obstacle detection and the current second result of obstacle detection, and not indicated by the other one of the current first result of obstacle detection and the current second result of obstacle detection; and
   D) calculating, when it is determined that there is at least one distinct obstacle, a penalty score based on said at least one distinct obstacle, and updating the credibility score by subtracting the penalty score from the credibility score.

2. The method as claimed in claim 1, wherein step D) includes sub-steps of:
   D-1) determining whether said at least one distinct obstacle is indicated by the current first result of obstacle detection;
   D-2) calculating, when it is determined that said at least one distinct obstacle is not indicated by the current first result of obstacle detection, first penalty points, which serve as a portion of the penalty score, based on said at least one distinct obstacle, and updating the credibility score by subtracting the first penalty points from the credibility score; and
   D-3) calculating, when it is determined that said at least one distinct obstacle is indicated by the current first result of obstacle detection, second penalty points, which serve as a portion of the penalty score, based on said at least one distinct obstacle, and updating the credibility score by subtracting the second penalty points from the credibility score.

3. The method as claimed in claim 2, the storage device further storing a first lookup table which contains information of a correspondence relationship between base penalty points representative of severity of failing to detect an obstacle and an actual distance of an obstacle from the image capturing device, a first penalty weight which corresponds to the first classification, and a second penalty weight which corresponds to the second classification, wherein:
   in step A), the current first result of obstacle detection indicates the obstacle(s) detected by the first classification and at least one position of the obstacle(s) detected by the first classification in the current one of the images;

in step B), the current second result of obstacle detection indicates the obstacle(s) detected by the second classification and at least one position of the obstacle(s) detected by the second classification in the current one of the images;

step D-2) includes computing an actual distance of said at least one distinct obstacle from the image capturing device based on the position of said at least one distinct obstacle in the current one of the images, obtaining the base penalty points based on the first lookup table and the actual distance of said at least one distinct obstacle from the image capturing device, and calculating the first penalty points by multiplying the first penalty weight and the base penalty points thus obtained; and step D-3) includes computing an actual distance of said at least one distinct obstacle from the image capturing device based on the position of said at least one distinct obstacle in the current one of the images, obtaining the base penalty points based on the first lookup table and the actual distance of said at least one distinct obstacle from the image capturing device, and calculating the second penalty points by multiplying the second penalty weight and the base penalty points thus obtained.

4. The method as claimed in claim 2, the storage device further storing a first lookup table which contains information of a correspondence relationship between base penalty points representative of severity of failing to detect an obstacle and a type of the obstacle, a first penalty weight corresponding to the first classification and a second penalty weight corresponding to the second classification, wherein:

in step A), the current first result of obstacle detection indicates the obstacle(s) detected by the first classification and at least one type of the obstacle(s) detected by the first classification in the current one of the images;

in step B), the current second result of obstacle detection indicates the obstacle(s) detected by the second classification and at least one type of the obstacle(s) detected by the second classification in the current one of the images;

step D-2) includes obtaining the base penalty points based on the first lookup table and the type of said least one distinct obstacle, and calculating the first penalty points by multiplying the first penalty weight and the base penalty points thus obtained; and step D-3) includes obtaining the base penalty points based on the first lookup table and the type of said least one distinct obstacle, and calculating the second penalty points by multiplying the second penalty weight and the base penalty points thus obtained.

5. The method as claimed in claim 1, subsequent to step A), further comprising steps of:

E) determining, based on the current first result of obstacle detection and a previous first result of obstacle detection, which is obtained by performing the first classification on a previous one of the images and which indicates at least one obstacle detected by the first classification in the previous one of the images, whether there is at least one first particular obstacle, which is at least one of the obstacle(s) indicated by one of the current first result of obstacle detection and the previous first result of obstacle detection, and not indicated by the other one of the current first result of obstacle detection and the previous first result of obstacle detection; and F) calculating, when it is determined that there is at least one first particular obstacle, third penalty points based on said at least one first particular obstacle, and updating the credibility score by subtracting the third penalty points from the credibility score.

6. The method as claimed in claim 5, the storage device further storing a second lookup table which contains information of a correspondence relationship between raw penalty points representative of severity of failing to detect an obstacle in one of two consecutive images and a position of the obstacle in the other one of the two consecutive images, wherein:

in step A), the current first result of obstacle detection indicates the obstacle(s) detected by the first classification and at least one position of the obstacle(s) detected by the first classification in the current one of the images, the previous first result of obstacle detection indicates the obstacle(s) detected by the first classification and at least one position of the obstacle(s) detected by the first classification in the previous one of the images; and step F) includes obtaining the raw penalty points based on the second lookup table and the position of said at least one first particular obstacle indicated by said one of the current first result of obstacle detection and the previous first result of obstacle detection, and calculating the third penalty points based on the raw penalty points thus obtained.

7. The method as claimed in claim 1, subsequent to step B), further comprising steps of:

G) determining, based on the current second result of obstacle detection and a previous second result of obstacle detection, which is obtained by performing the second classification on a previous one of the images and which indicates at least one obstacle detected by the second classification in the previous one of the images, whether there is at least one second particular obstacle, which is at least one of the obstacle(s) indicated by one of the current second result of obstacle detection and the previous second result of obstacle detection, and not indicated by the other one of the current second result of obstacle detection and the previous second result of obstacle detection; and H) calculating, when it is determined that there is at least one second particular obstacle, fourth penalty points based on said at least one second particular obstacle so as to update the credibility score by subtracting the fourth penalty points from the credibility score.

8. The method as claimed in claim 7, the storage device further storing a second lookup table which contains information of a correspondence relationship between raw penalty points representative of severity of failing to detect an obstacle in one of two consecutive images and a position of the obstacle in the other one of the two consecutive images, wherein:

in step B), the current second result of obstacle detection includes the obstacle(s) detected by the second classification and at least one position of the obstacle(s) detected by the second classification in the current one of the images, the previous second result of obstacle detection indicates the obstacle(s) detected by the second classification and at least one position of the obstacle(s) detected by the second classification in the previous one of the images; and step H) includes obtaining the raw penalty points based on the second lookup table and the position of said at least one second particular obstacle indicated by said one of the current second result of obstacle detection and the previous second result of obstacle detection, and calculating the fourth penalty points based on the raw penalty points thus obtained.

9. The method as claimed in claim 1, wherein:

in step A), the first classification is implemented by detection of contour and texture in one of the images; and in step B), the second classification is implemented according to deep learning.

10. The method as claimed in claim 9, wherein:

in step A), the first classification is implemented to perform detection of contour and texture in one of the images according to histogram of oriented gradient (HOG) and logarithm weighted patterns (LWP), and to perform detection of obstacles in the image according to support vector machine (SVM); and in step B), the second classification is implemented to perform detection of obstacles in the image according to convolutional neural networks (CNN).

* * * * *